US010374769B2

(12) United States Patent
Chang et al.

(10) Patent No.: US 10,374,769 B2
(45) Date of Patent: Aug. 6, 2019

(54) USER EQUIPMENT AND METHODS FOR PHYSICAL UPLINK CONTROL CHANNEL (PUCCH) RESOURCE ALLOCATION AND COMMUNICATION

(71) Applicant: Intel IP Corporation, Santa Clara, CA (US)

(72) Inventors: Wenting Chang, Beijing (CN); Yuan Zhu, Beijing (CN); Yushu Zhang, Beijing (CN); Gang Xiong, Beaverton, OR (US); Seunghee Han, San Jose, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/559,991

(22) PCT Filed: Sep. 15, 2015

(86) PCT No.: PCT/US2015/050250
§ 371 (c)(1),
(2) Date: Sep. 20, 2017

(87) PCT Pub. No.: WO2016/171748
PCT Pub. Date: Oct. 27, 2016

(65) Prior Publication Data
US 2018/0069675 A1    Mar. 8, 2018

Related U.S. Application Data

(63) Continuation of application No. PCT/CN2015/077099, filed on Apr. 21, 2015.

(51) Int. Cl.
*H04W 4/00* (2018.01)
*H04L 5/00* (2006.01)
(Continued)

(52) U.S. Cl.
CPC .............. *H04L 5/0051* (2013.01); *H04L 1/00* (2013.01); *H04L 5/0037* (2013.01);
(Continued)

(58) Field of Classification Search
CPC ......... H04W 28/0289; H04W 72/0413; H04W 72/0493; H04W 72/1284; H04W 72/0446
See application file for complete search history.

(56) References Cited

U.S. PATENT DOCUMENTS

2010/0309867 A1* 12/2010 Palanki ................. H04L 5/0053
370/329
2011/0081932 A1* 4/2011 Astely ..................... H04L 5/001
455/509

(Continued)

FOREIGN PATENT DOCUMENTS

CN         107431586        12/2017
EP         2421317 A1        2/2012

OTHER PUBLICATIONS

"International Application Serial No. PCT/US2015/050250, International Preliminary Report on Patentability dated Nov. 2, 2017", 12 pgs.

(Continued)

*Primary Examiner* — Abdelnabi O Musa
(74) *Attorney, Agent, or Firm* — Schwegman Lundberg & Woessner, P.A.

(57) ABSTRACT

Embodiments of a User Equipment (UE), an Evolved Node-B (eNB), and methods for communication of uplink messages are generally described herein. The UE may receive, from an eNB, one or more downlink control messages that may indicate an allocation of PUCCH channel resources. The UE may transmit an uplink control message in at least a portion of the allocated PUCCH channel resources. When the PUCCH channel resources are allocated according to an edge configuration, the PUCCH chan- (Continued)

nel resources may be restricted to a lower edge portion and an upper edge portion of the network channel resources. When the PUCCH channel resources are allocated according to a distributed configuration, the PUCCH channel resources may include one or more middle portions of the network channel resources. The middle portions may be exclusive to the lower edge and upper edge portions.

26 Claims, 7 Drawing Sheets

(51) Int. Cl.
  *H04W 28/02* (2009.01)
  *H04W 72/04* (2009.01)
  *H04W 72/12* (2009.01)
  *H04L 1/00* (2006.01)

(52) U.S. Cl.
  CPC .......... *H04L 5/0053* (2013.01); *H04L 5/0094* (2013.01); *H04W 28/0289* (2013.01); *H04W 72/0413* (2013.01); *H04W 72/0493* (2013.01); *H04W 72/1284* (2013.01); *H04W 72/0446* (2013.01)

(56) References Cited

U.S. PATENT DOCUMENTS

| | | |
|---|---|---|
| 2011/0235602 A1 | 9/2011 | Ji et al. |
| 2011/0274062 A1* | 11/2011 | Cheng .................. H03M 13/13 370/329 |
| 2012/0300741 A1 | 11/2012 | Han et al. |
| 2013/0083754 A1* | 4/2013 | Chen ................. H04W 72/0406 370/329 |
| 2017/0171853 A1* | 6/2017 | Lindoff ................. H04W 48/16 |

OTHER PUBLICATIONS

"International Application Serial No. PCT/US2015/050250, International Search Report dated Feb. 23, 2016", 3 pgs.

"International Application Serial No. PCT/US2015/050250, Written Opinion dated Feb. 23, 2016", 10 pgs.

Alcatel-Lucent, et al., "PUCCH design for A/N feedbacks on PCell up to 32 carrier aggregation", R1-151326, 3GPP TSG-RAN WG1 Meeting #80bis, Belgrade, Serbia, (Apr. 11, 2015), 2-3.

Huawei, et al., "New PUCCH format design to support UCI transmission for up to 32 component carriers", R1-151275, 3GPP TSG RAN WG1 Meeting #80bis, Belgrade, Serbia, (Apr. 10, 2015), 1-4.

"European Application Serial No. 15890142.1, Extended European Search Report dated Nov. 2, 2018", 11 pgs.

"European Application Serial No. 15890142.1, Response filed May 16, 2019 to Extended European Search Report dated Nov. 2, 2018", 30 pgs.

* cited by examiner

USER EQUIPMENT AND METHODS FOR PHYSICAL UPLINK CONTROL CHANNEL (PUCCH) RESOURCE ALLOCATION AND COMMUNICATION

PRIORITY CLAIM

This application is a U.S. National Stage Filing under 35 U.S.C. 371 from International Application No. PCT/US2015/050250, filed Sep. 15, 2015 and published in English as WO 2016/171748 on Oct. 27, 2016, which is a continuation of and claims priority under 35 U.S.C. 120 to International Application No. PCT/CN2015/077099, filed Apr. 21, 2015, each of which is incorporated herein by reference in its entirety.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and 5G networks, although the scope of the embodiments is not limited in this respect. Some embodiments relate to physical uplink control channel (PUCCH) resource block allocation. Some embodiments relate to signaling of resources for PUCCH communication.

BACKGROUND

A wireless network may support communication with mobile devices. Accordingly, control messages may be exchanged between the mobile devices and a base station as part of the communication. In some cases, the reliability of such exchanges may affect system performance in terms of throughput, capacity or other measure. As an example, diversity techniques or other techniques may improve the reliability in some cases. As such, there is a general need for methods and systems of exchanging control messages between the mobile devices and the base station in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
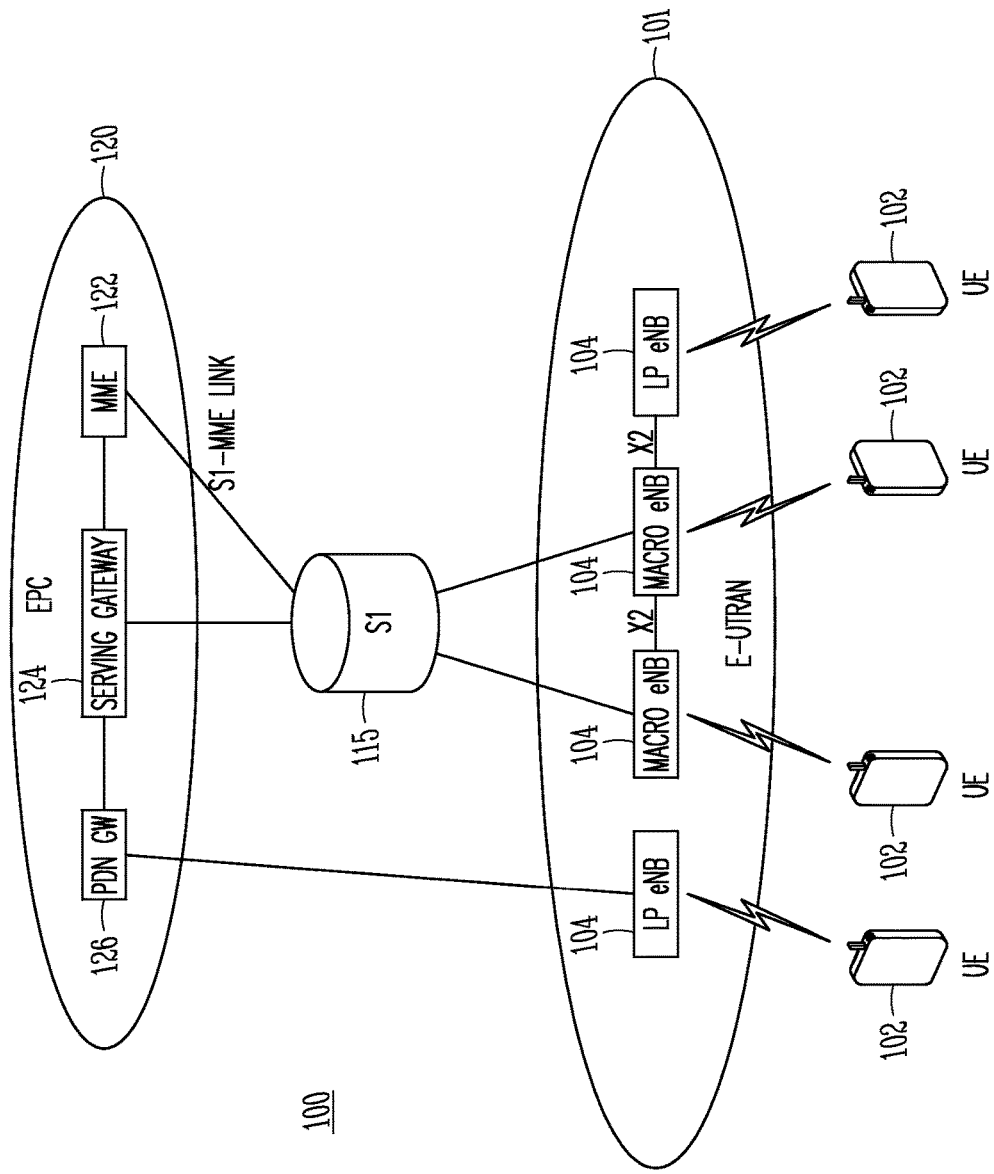
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity sake, only a portion of the core network 120, as well as the RAN 101, is shown.

The core network 120 includes a mobility management entity (MME) 122, a serving gateway (serving GW) 124, and packet data network gateway (PDN GW) 126. The RAN 101 includes Evolved Node-B's (eNBs) 104 (which may operate as base stations) for communicating with User Equipment (UE) 102. The eNBs 104 may include macro eNBs and low power (LP) eNBs. In accordance with some embodiments, the eNB 104 may transmit a downlink control message to the UE 102 to indicate an allocation of physical uplink control channel (PUCCH) channel resources. The UE 102 may receive the downlink control message from the eNB 104, and may transmit an uplink control message to the eNB 104 in at least a portion of the PUCCH channel resources. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 101 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel. Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
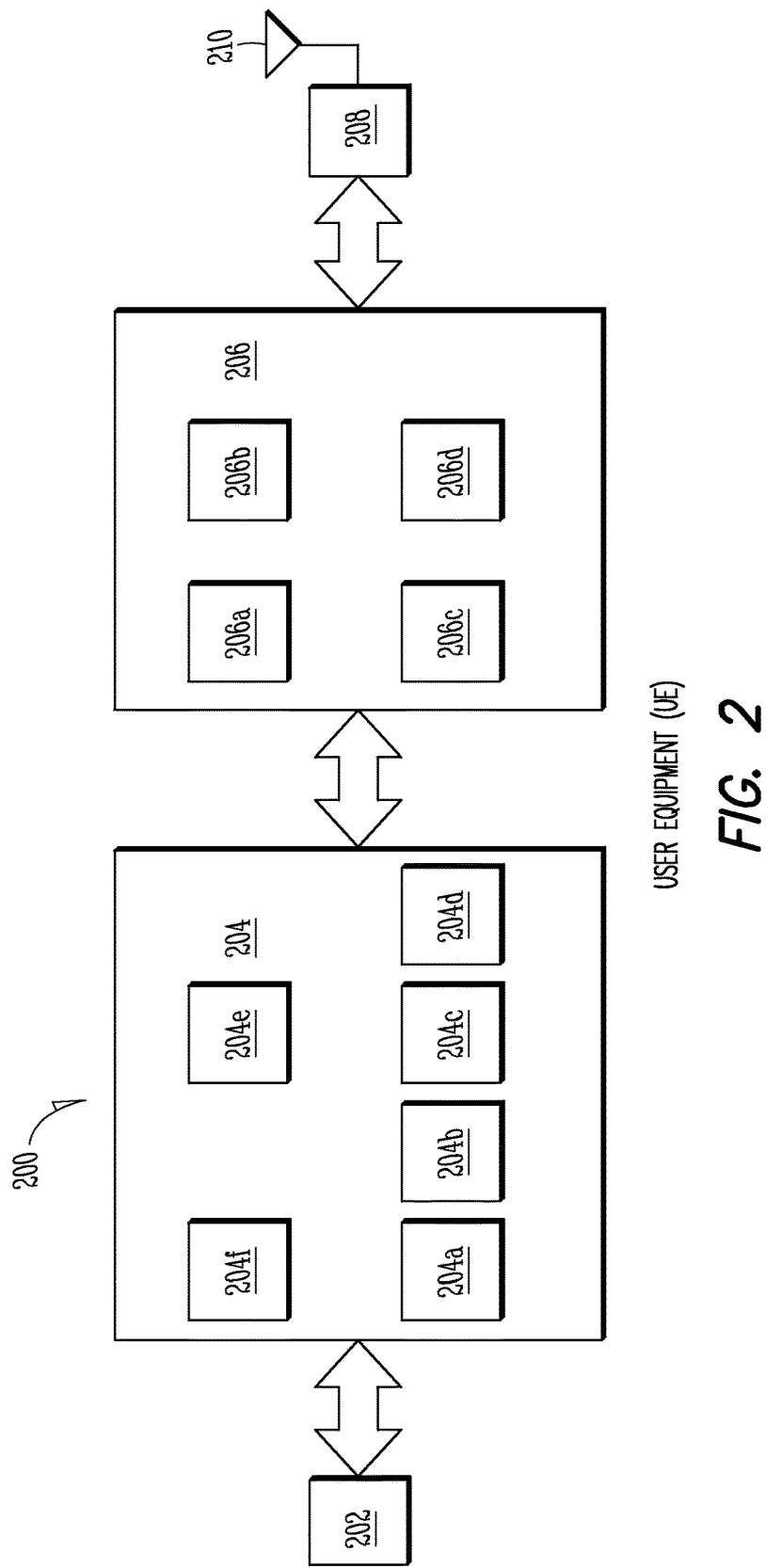
FIG. 2 is a block diagram of a User Equipment (UE) in accordance with some embodiments.

FIG. 2 is a functional diagram of a User Equipment (UE) in accordance with some embodiments. The UE 200 may be suitable for use as a UE 102 as depicted in FIG. 1. In some embodiments, the UE 200 may include application circuitry 202, baseband circuitry 204, Radio Frequency (RF) circuitry 206, front-end module (FEM) circuitry 208 and one or more antennas 210, coupled together at least as shown. In some embodiments, other circuitry or arrangements may include one or more elements and/or components of the application circuitry 202, the baseband circuitry 204, the RF circuitry 206 and/or the FEM circuitry 208, and may also include other elements and/or components in some cases. As an example, "processing circuitry" may include one or more elements and/or components, some or all of which may be included in the application circuitry 202 and/or the baseband circuitry 204. As another example, "transceiver circuitry" may include one or more elements and/or components, some or all of which may be included in the RF circuitry 206 and/or the FEM circuitry 208. These examples are not limiting, however, as the processing circuitry and/or the transceiver circuitry may also include other elements and/or components in some cases.

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect. In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206. In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider. The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer. In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210. In some embodiments, the UE 200 may include additional elements such as, for example, memory/storage, display, camera, sensor, and/or input/output (I/O) interface.

Figure 3:
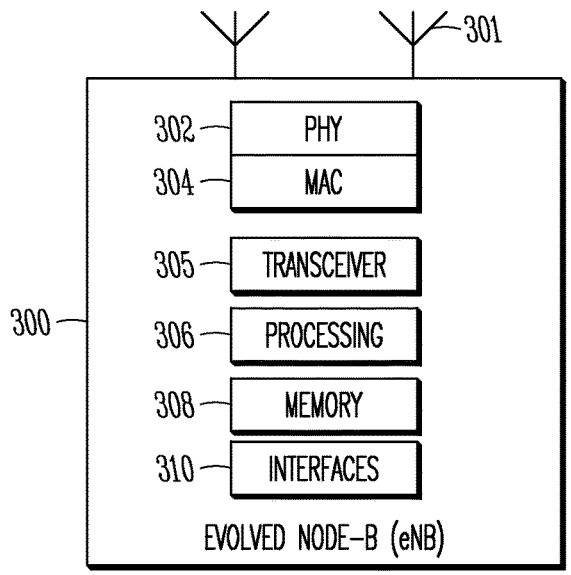
FIG. 3 is a block diagram of an Evolved Node-B (eNB) in accordance with some embodiments.

FIG. 3 is a functional diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 210, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210, 301 may be effectively separated to take advantage of spatial diversity and the different channel characteristics that may result.

In some embodiments, the UE 200 or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 200 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 200, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 200 and/or eNB 300 may include various components of the UE 200 and/or the eNB 300 as shown in FIGS. 2-3. Accordingly, techniques and operations described herein that refer to the UE 200 (or 102) may be applicable to an apparatus for a UE. In addition, techniques and operations described herein that refer to the eNB 300 (or 104) may be applicable to an apparatus for an eNB.

In accordance with embodiments, the UE 102 may receive, from an eNB 104, one or more downlink control messages that may indicate an allocation of PUCCH channel resources. The UE 102 may transmit an uplink control message in at least a portion of the allocated PUCCH channel resources. When the PUCCH channel resources are allocated according to an edge configuration, the PUCCH channel resources may be restricted to a lower edge portion and an upper edge portion of the network channel resources. When the PUCCH channel resources are allocated according to a distributed configuration, the PUCCH channel resources may include one or more middle portions of the network channel resources. These embodiments are described in more detail below.

Figure 4:
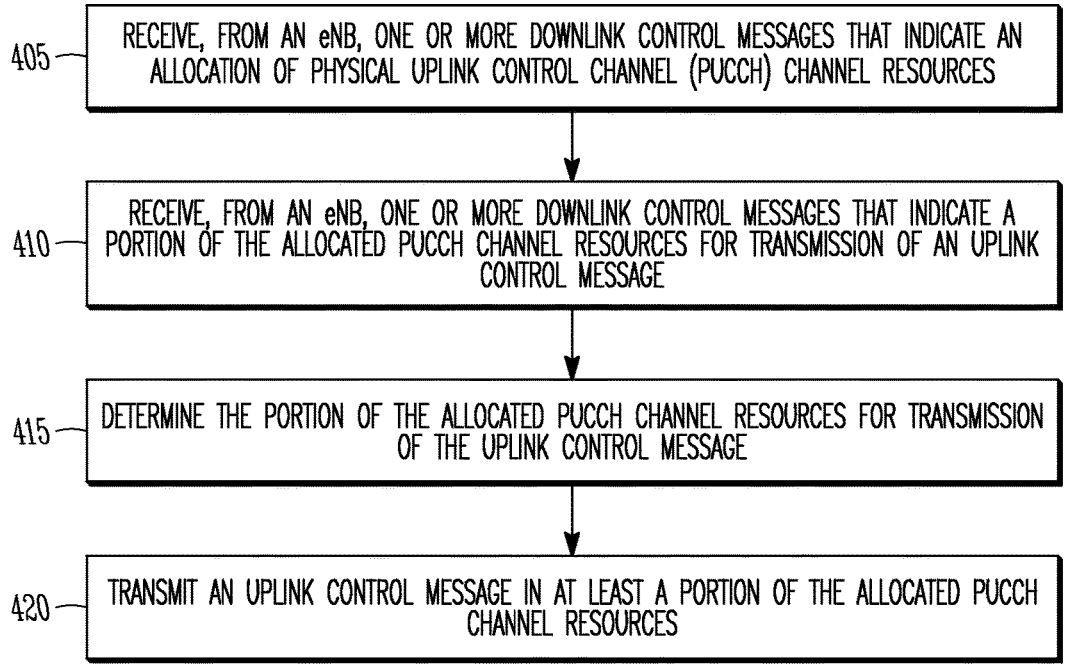
FIG. 4 illustrates the operation of a method of physical uplink control channel (PUCCH) communication in accordance with some embodiments.

FIG. 4 illustrates the operation of a method of physical uplink control channel (PUCCH) communication in accordance with some embodiments. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-9, although it is understood that the method 400 may be practiced with any other suitable systems, interfaces and components.

In addition, while the method 400 and other methods described herein may refer to eNBs 104 or UEs 102 operating in accordance with 3GPP or other standards, embodiments of those methods are not limited to just those eNBs 104 or UEs 102 and may also be practiced on other mobile devices, such as a Wi-Fi access point (AP) or user station (STA). In addition, the method 400 and other methods described herein may be practiced by wireless devices configured to operate in other suitable types of wireless communication systems, including systems configured to operate according to various IEEE standards such as IEEE 802.11. The method 400 may also refer to an apparatus for a UE 102 and/or eNB 104 or other device described above.

At operation 405 of the method 400, the UE 102 may receive, from an eNB 104 configured to operate in a network, one or more downlink control messages that may indicate an allocation of PUCCH channel resources. In some embodiments, the PUCCH channel resources may be included in network channel resources. That is, the network channel resources may be allocated for the network for exchanging of data messages and/or control messages. A portion of the network channel resources may be allocated as PUCCH channel resources to accommodate PUCCH transmissions by UEs 102. In some embodiments, the PUCCH channel resources may be reserved exclusively for the PUCCH transmissions, although embodiments are not limited as such. In addition, one or more portions of the network channel resources may also be allocated for other purposes. For instance, physical uplink shared channel (PUSCH) channel resources may be allocated for transmission of data by the UEs 102. It should be noted that embodiments are not limited to the use of PUCCH and/or PUSCH arrangements that may be included in 3GPP or other standards, as other control channels and/or data channels may also be used in some embodiments.

In some embodiments, the PUCCH channel resources may be allocated according to either an edge configuration or a distributed configuration, which will be described below. These embodiments are not limiting, however, as the PUCCH channel resources may be allocated according to any number of configurations in some embodiments, which may or may not include the edge configuration and/or the distributed configuration. As an example, a third configuration, or additional configurations, may be used in addition to the edge configuration and distributed configuration.

In some embodiments, the PUCCH channel resources may be allocated according to a legacy configuration for usage by UEs 102 configured as legacy UEs 102, and further allocated according to a non-legacy configuration for usage by UEs 102 configured as non-legacy UEs 102. As a non-limiting example, the edge configuration may be used as the legacy configuration and the distributed configuration may be used as the non-legacy configuration. These embodiments are not limiting, however, as the PUCCH channel resources may not necessarily be configured according to legacy/non-legacy operation in some embodiments. In some embodiments, the PUCCH channel resources may include a legacy portion and a non-legacy portion simultaneously. In some embodiments, the PUCCH channel resources may include either a legacy portion or a non-legacy portion.

The one or more downlink control messages may indicate which type of allocation (distributed, edge and/or other) is to be used. The messages may also indicate other information related to the allocation in some cases. As an example, the particular portion(s) of the network channel resources to be allocated as PUCCH channel resources may be included or indicated. As another example, related information may be included or indicated to enable the UE 102 to determine the PUCCH channel resources (such as a size and/or frequency locations of the PUCCH channel resources).

In some embodiments, the network channel resources and/or the PUCCH channel resources may include one or more resource blocks (RBs), which may include multiple resource elements (REs). These embodiments are not limiting, however, as the network channel resources and/or the PUCCH channel resources may include any number of sub-carriers, sub-channels and/or other bandwidths or frequency spans. In some embodiments, time resources may include one or more slots, sub-frames, symbol periods, OFDM symbol periods or other. As a non-limiting example, a sub-frame may span a time duration of one millisecond and may include two non-overlapping consecutive slots of 500 microseconds each. Such time durations may be included in 3GPP and/or other standards, but embodiments are not limited as such.

In some embodiments, when the PUCCH channel resources are allocated according to the edge configuration, the PUCCH channel resources may be restricted to a lower edge portion and an upper edge portion of the network channel resources. The lower edge portion may be substantially near a lower edge of a frequency range of the network channel resources and the upper edge portion may be substantially near an upper edge of the frequency range of the network channel resources. As a non-limiting example, the lower edge portion may be included in approximately a lower 25 percent of the network channel resources and the upper edge portion may be included in approximately an upper 25 percent of the network channel resources. Embodiments are not limited to the threshold of 25 percent, however, as other suitable thresholds may be used, such as 5, 10, 15, 30 or other value of percentage.

It should be noted that, in some cases, the lower edge portion and upper edge portion may or may not include the lower edge and/or upper edge of the frequency range of the network channel resources. As an example, the lower edge portion may include the lower 5%-15% of the frequency range, which is located within the lower 25% of the range but does not include the lowest 5% (and therefore the lower edge). Accordingly, the lower and upper edge portions may be concentrated near the edges of the frequency range but may not necessarily include the edges in some cases.

In some embodiments, when the PUCCH channel resources are allocated according to the distributed configuration, the PUCCH channel resources may include one or more middle portions of the network channel resources. As a non-limiting example, at least one of the middle portions may be included in a frequency range substantially near a center frequency of the network channel resources, such as within a middle 25 percent (or suitable number like 5, 10, 15, 30 or other) of the network channel resources. As another non-limiting example, the middle portions may be exclusive to lower edge and upper edge portions like those described previously. As another non-limiting example, the PUCCH channel resources when allocated according to the distributed configuration may also include at least a portion of the lower edge portion or the upper edge portion. Accordingly, the PUCCH channel resources may be distributed (in some manner) throughout the network channel resources when allocated according to the distributed configuration.

At operation 410, the UE 102 may receive, from the eNB 104, one or more downlink control messages that may indicate a portion of the allocated PUCCH channel resources for transmission of an uplink control message. At operation 415, the UE 102 may determine the portion of the allocated PUCCH channel resources for the transmission of the uplink control message. Although not limited as such, in some cases the determination may be based at least partly on information included in the downlink control messages. At operation 420, the UE 102 may transmit the uplink control message in at least a portion of the allocated PUCCH channel resources. In some embodiments, the portion may be determined at operations 410 and/or 415. These embodiments are not limiting, however, as the portion may be determined using other techniques. For instance, in a persistent scheduling arrangement, the PUCCH channel resources to be used by the UE 102 may have been previously used (in previous frames or otherwise) by the UE 102 for transmission of uplink control messages and may be reused for such purpose.

In some embodiments, a physical RB (PRB) index and/or a PUCCH resource index and/or other information may be included in the messages to indicate a portion of RBs of the allocated PUCCH channel resources that are to be used by the UE 102. As another example, an intermediate value or other information may be included in the downlink control message(s), and may be used, by the UE 102, to determine the PRB index or the RBs to be used by the UE 102. Examples of such intermediate values will be presented below.

In some embodiments, the one or more downlink control messages received at the UE 102 at operation 410 may include one or more radio resource control (RRC) messages that may be included in 3GPP or other standards. These embodiments are not limiting, however, as other suitable control messages may be used in some embodiments. In some embodiments, the PRB index and/or the PUCCH resource index may be included in a downlink control information (DCI) element included in the RRC messages. These embodiments are not limiting, however, as any suitable technique may be used for communication of the information to the UE 102 for determination of the PUCCH resources to be used.

In some embodiments, the UE 102 may receive a UE identifier that may identify the UE 102. The UE identifier may be assigned to the UE 102 by the eNB 104, although embodiments are not so limited. As an example, a number between 0 and 2047 may be used for the UE identifier. As will be described below, such an identifier may be used to determine which PUCCH resources are to be used by the UE 102. For instance, a many-to-one mapping of UE identifier to PUCCH RBs may be used or determined. The UE 102 may receive the UE identifier in one or more downlink control messages (such as RRC messages). For instance, the UE identifier may be communicated to the UE 102 as part of a setup or initialization process.

It should be noted that parameters, information or other values communicated to the UE 102 in downlink messages as described may be included in one or more such messages. Embodiments are not limited to individual downlink messages for such communication, however. For instance, a downlink message may communicate a configuration of PUCCH RBs to be used and a particular PUCCH RB to be used by the UE 102. In addition, the downlink control messages may include dedicated control messages and/or broadcast control messages in some embodiments.

Figure 5:
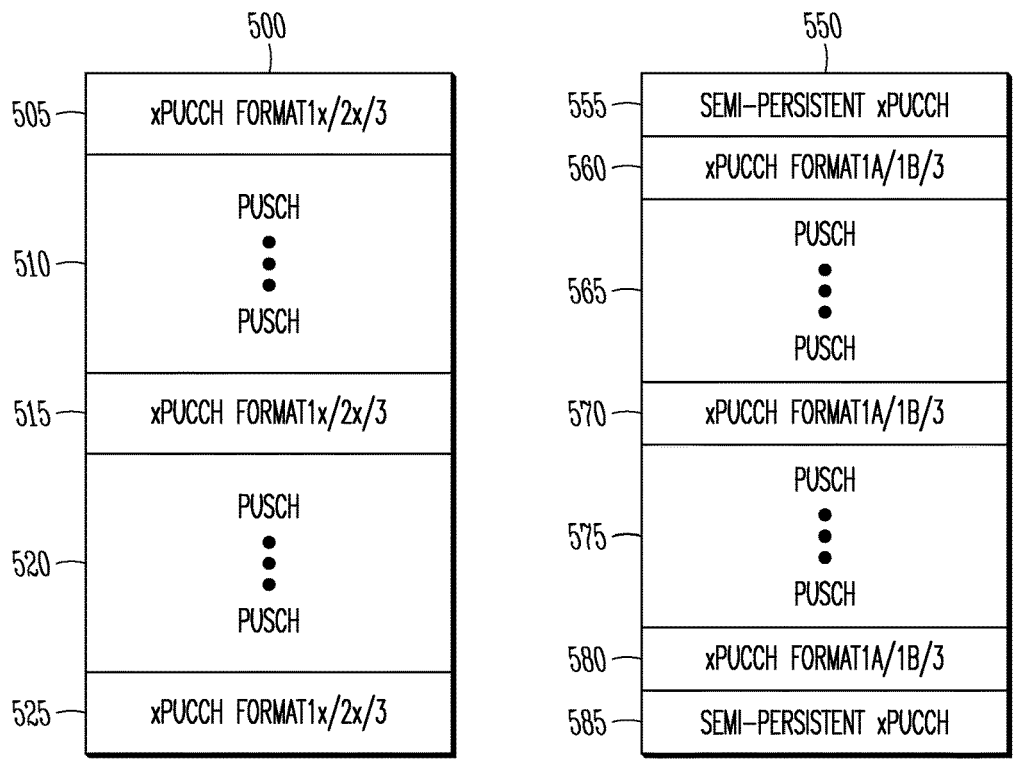
FIG. 5 illustrates examples of allocation of channel resources for PUCCH communication in accordance with some embodiments.
Figure 6:
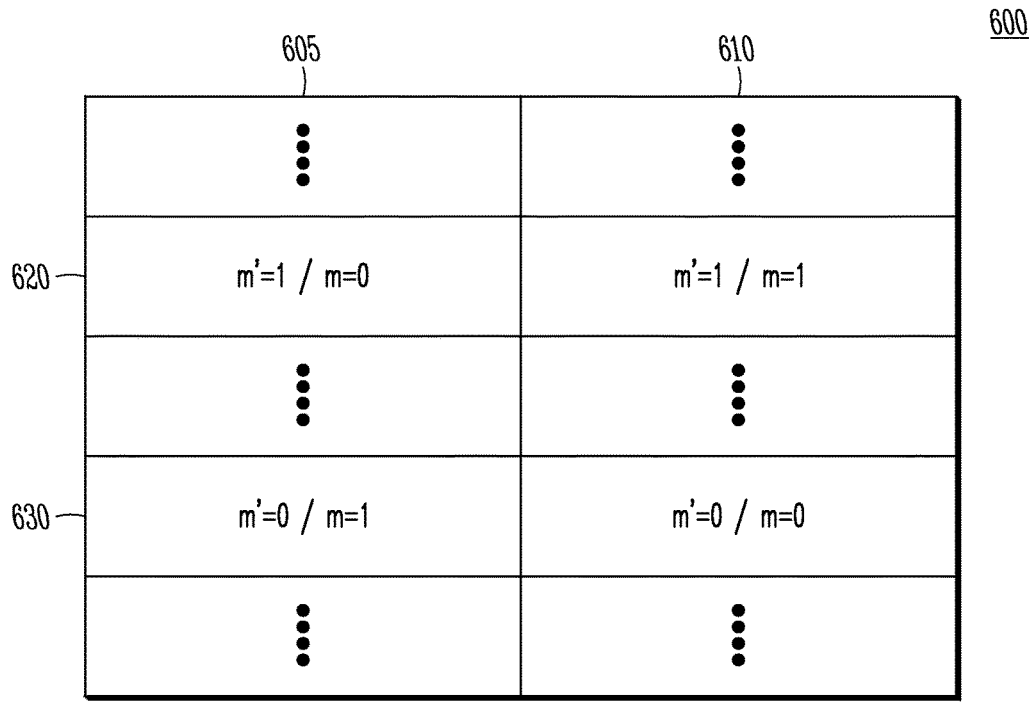
FIG. 6 illustrates another example of allocation of channel resources for PUCCH communication in accordance with some embodiments.
Figure 7:
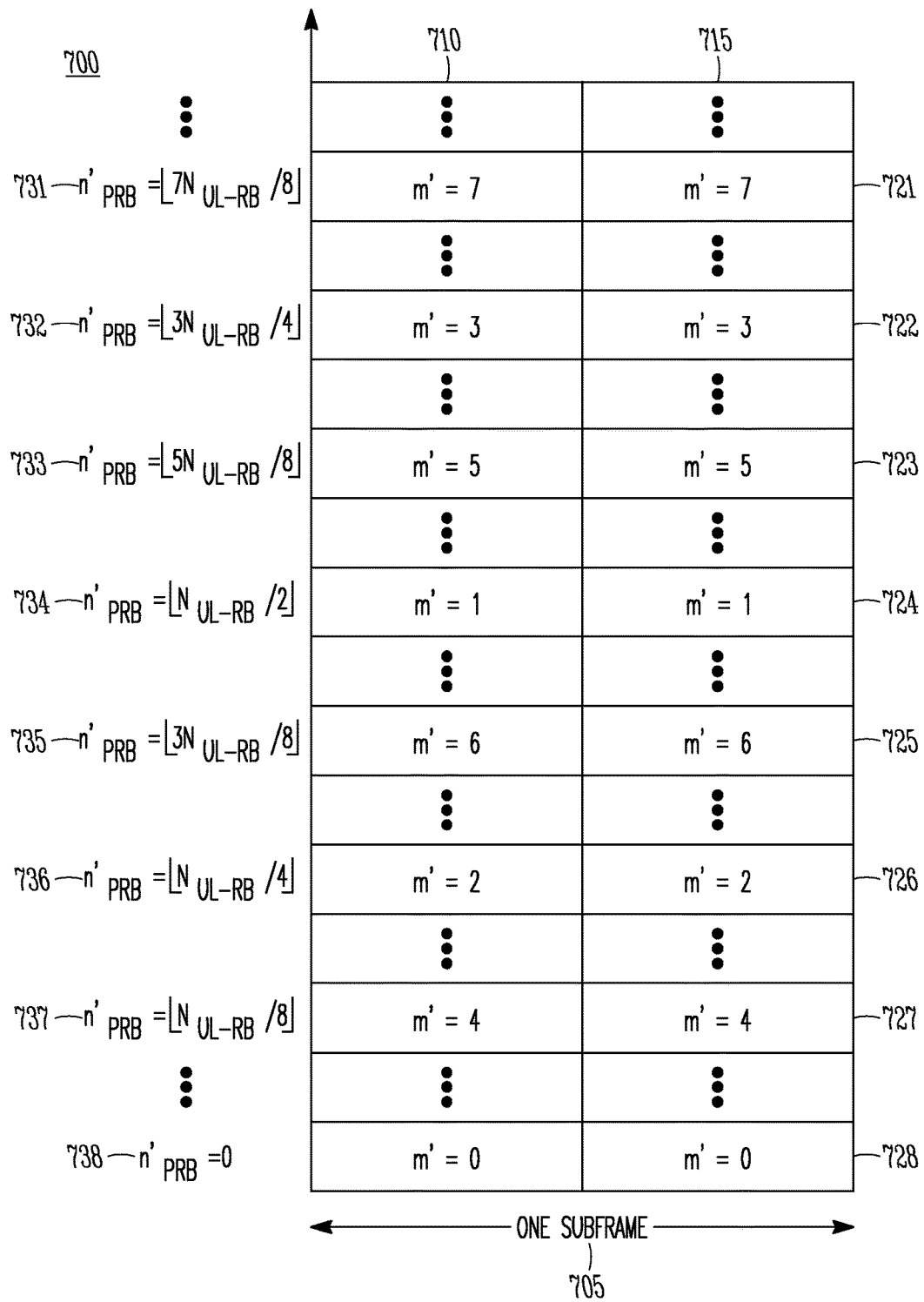
FIG. 7 illustrates an example of a distributed, pair-wise allocation of channel resources for PUCCH communication in accordance with some embodiments.
Figure 8:
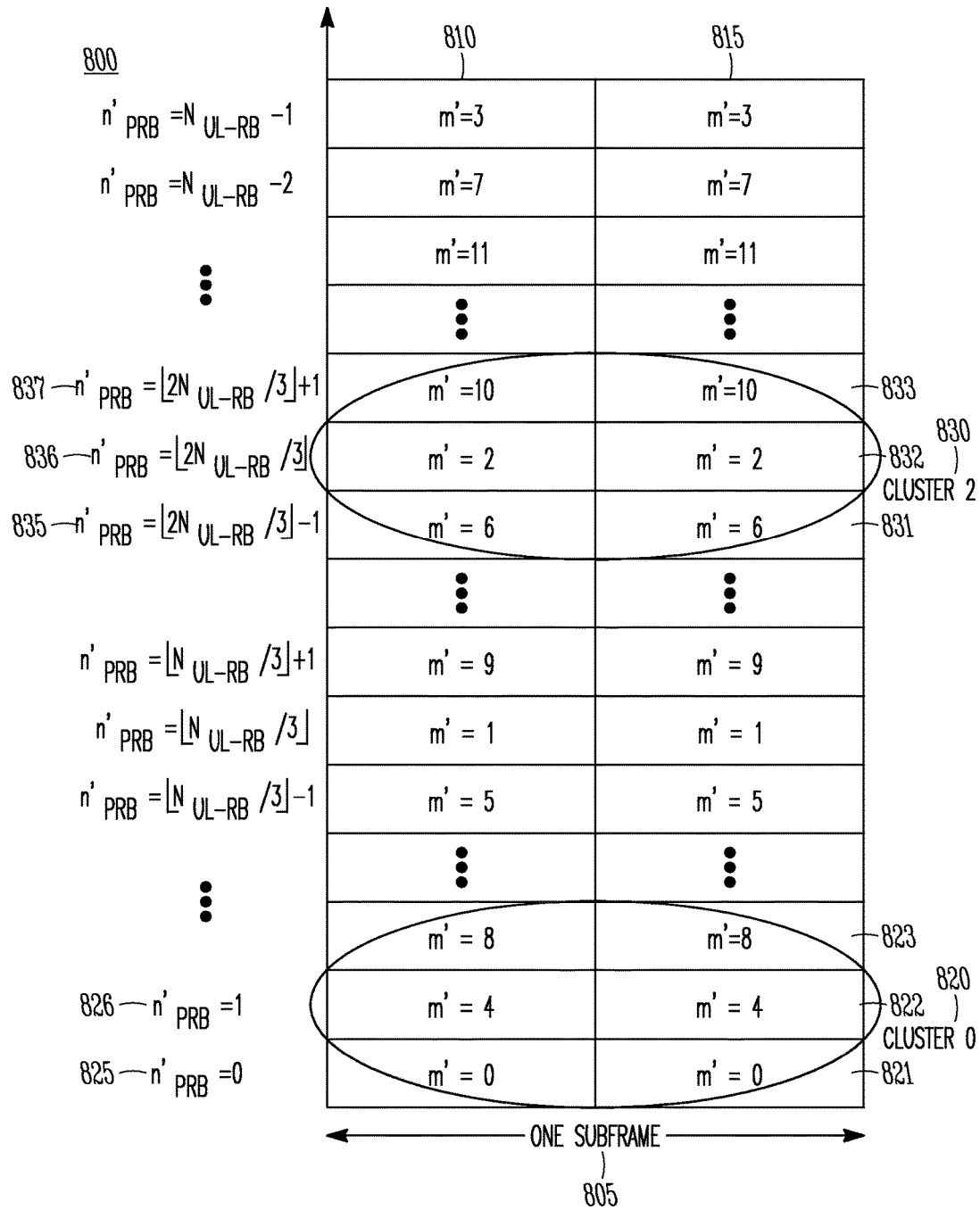
FIG. 8 illustrates an example of a distributed, cluster-based allocation of channel resources for PUCCH communication in accordance with some embodiments.

Several examples related to allocation of PUCCH channel resources will be presented below. FIG. 5 illustrates examples of allocation of channel resources for PUCCH communication in accordance with some embodiments. FIG. 6 illustrates another example of allocation of channel resources for PUCCH communication in accordance with some embodiments. FIG. 7 illustrates an example of a distributed, pair-wise allocation of channel resources for PUCCH communication in accordance with some embodiments. FIG. 8 illustrates an example of a distributed, cluster-based allocation of channel resources for PUCCH communication in accordance with some embodiments.

Although the examples shown in FIGS. 5-8 may illustrate some aspects of techniques disclosed herein, it is understood that embodiments are not limited to these examples. Techniques and scenarios discussed are not limited to the number or types of channel resources, RBs, slots or other frequency units or time units shown in these examples, as any suitable number or types may be used.

Referring to FIG. 5, in the example scenario 500, a distributed configuration may be used for all PUCCH formats (semi-persistent, non semi-persistent and otherwise). Accordingly, the PUCCH channel resources indicated by 505, 515, 525 distributed throughout the channel resources may be used for those PUCCH formats. In the example scenario 550, PUCCH channel resources 560, 570, and 580 are distributed throughout the channel resources, and may be used for non semi-persistent formats as shown. In addition, PUCCH channel resources 555, 585 are located substantially near the edges of the channel resources, and may be used for semi-persistent formats as indicated. It should be noted that the number of regions for the distributed configurations are not limited to the three regions shown in the example of FIG. 5. In addition, embodiments are not limited to the usage of the PUSCH regions as shown in the example scenarios 500, 550.

In some cases, when the distributed configuration is used (or available) for all PUCCH formats, more flexible RRC configurability may be used to better support PUCCH inter-cell interference coordination (ICIC). However, it may be easier to achieve scheduling gain for PUCCH formats like 1a, 1b, and 3 included in the 3GPP standards, as those formats utilize ACK/NAK bits and may be driven by physical downlink shared channel (PDSCH) transmission.

In some embodiments, the uplink control message may be transmitted according to a localized slot configuration or according to a non-localized slot configuration. As an example, when a first slot and a second slot are used, a first portion of the uplink control message may be transmitted during the first slot in a first RB and a second portion of the uplink control message may be transmitted during the second slot in a second RB. For the localized slot configuration, the first RB and second RB may be the same RB. For the non-localized slot configuration, the first RB and second RB may be different. Although not limited as such, the non-localized configuration may be applicable to legacy operation in some cases.

It should be noted that in some embodiments, the uplink control message may be transmitted on multiple slots and/or in multiple RBs, which may be performed by splitting the message, repeating the message or other technique. As an example, the message may be split across the multiple slots and/or multiple RBs. As another example, the message may be repeated on the multiple slots and/or multiple RBs for diversity purposes. The examples in FIGS. 6-8 may employ these techniques, in some cases, but are not limited as such.

Referring to the example in FIG. 6, a first slot 605 and a second slot 610 may be used for transmission of the uplink control message. As an example of a localized configuration, when the value of the intermediate variable m' (which will be described below) is zero, the uplink control message may be transmitted in RB 630 during both slots 605 and 610. As another example of a localized configuration, when the value of m' is one, the uplink control message may be transmitted in RB 620 during both slots 605 and 610. As an example of a non-localized configuration, when the value of the intermediate variable m (which will also be described below) is zero, the uplink control message may be transmitted in RB 620 during slot 605 and in RB 630 during slot 610. As another example of a non-localized configuration, when the value of m is one, the uplink control message may be transmitted in RB 630 during slot 605 and in RB 620 during slot 610.

As previously described, the intermediate value m (or m') may be determined based on a UE identifier or other parameters, such as a particular PUCCH format used (that may be included in 3GPP or other standards in some cases). As a non-limiting example, when PUCCH formats 1, 1a, or 1b are used, m may be determined as:

$$m = \begin{cases} N_{RB}^{(2)} & \text{if } n_{PUCCH}^{(1,\tilde{p})} < c \cdot N_{cs}^{(1)}/\Delta_{shift}^{PUCCH} \\ \left\lfloor \dfrac{n_{PUCCH}^{(1,\tilde{p})} - c \cdot N_{cs}^{(1)}/\Delta_{shift}^{PUCCH}}{c \cdot N_{sc}^{RB}/\Delta_{shift}^{PUCCH}} \right\rfloor + N_{RB}^{(2)} + \left\lceil \dfrac{N_{cs}^{(1)}}{8} \right\rceil & \text{otherwise} \end{cases}$$

As another non-limiting example, when PUCCH formats 2, 2a or 2b are used, m may be determined as:

$$m = \lfloor n_{PUCCH}^{(2,\tilde{p})}/N_{sc}^{RB} \rfloor$$

As another non-limiting example, when PUCCH format 3 is used, m may be determined as:

$$m = \lfloor n_{PUCCH}^{(3,\tilde{p})}/N_{SF,0}^{PUCCH} \rfloor$$

In some embodiments, the intermediate variable m (or m') may be used to determine a physical RB (PRB) index. As a non-limiting example, the PRB index may be determined as:

$$n_{PRB} = \begin{cases} \left\lfloor \frac{m}{2} \right\rfloor & \text{if } (m+n_s \bmod 2) \bmod 2 = 0 \\ N_{RB}^{UL} - 1 - \left\lfloor \frac{m}{2} \right\rfloor & \text{if } (m+n_s \bmod 2) \bmod 2 = 1 \end{cases}$$

Some or all of the parameters used in the above formulas (and others presented below) may be similar to or may be based on parameters used in the 3GPP or other standards, although not limited as such. For instance, the parameter $n_{PUCCH}$ may be related to a UE identifier (as previously described), and m may therefore depend on the UE identifier. As another example, the parameter $N^{UL}_{RB}$ may be or may be related to a number of RBs in the network channel resources.

Referring to the example in FIG. 7, the PUCCH channel resources may be allocated according to a "pair-wise" allocation. Accordingly, the RBs 721-728 allocated may be non-contiguous. Therefore, the PUCCH channel resources for the uplink control message transmissions may be allocated according to a pair of slots 710, 715 of the sub-frame 705 on each RB 721-728. As an example, when the intermediate variable m' has a value of 0, the uplink control message may be transmitted in RB 728 during both slots 710 and 715. The PRB index 738 may have a value of 0 in this case. As another example, when the intermediate variable m' has a value of 5, the uplink control message may be transmitted in RB 723 during both slots 710 and 715. In this case, the PRB index 733 may have a value of floor (5/8* $N_{UL\text{-}RB}$), in which $N_{UL\text{-}RB}$ may be a number of RBs in the network channel resources, and may be the same as or related to the parameter $N^{UL}_{RB}$ also described herein.

It should be noted that the mapping of the PRB indexes 731-738 with the value of m' as shown in FIG. 7 is an example mapping that is not limiting, and any suitable mapping may be used. As a non-limiting example, the mapping shown in FIG. 7 may be determined using a formula such as:

$$n'_{PRB}(m') = \begin{cases} \left\lfloor \frac{m' - 2^\alpha + 1}{2^{\alpha+1}} N_{RB}^{UL} \right\rfloor, & \text{if } \bmod(m', 2) = 0 \\ \left\lfloor \left(\frac{1}{2} + \frac{m' - 2^\alpha}{2^{\alpha+1}}\right) N_{RB}^{UL} \right\rfloor, & \text{if } \bmod(m', 2) = 1 \end{cases}$$

$$\alpha = \lfloor \log_2(m') \rfloor$$

It should be noted that the above formula and mapping may be for a localized configuration. As another non-limiting example, a distributed configuration may also be used, according to a formula such as $$\begin{cases} n_{PRB}(m) = n'_{PRB}(m + (-1)^m), \text{ for even slot} \\ n_{PRB}(m) = n'_{PRB}(m), \text{ for odd slot} \end{cases}$$

Referring to the example in FIG. 8, the PUCCH channel resources may be allocated according to a "cluster-based" allocation, in which the RBs included in the allocated PUCCH channel resources may be divided into one or more groups of contiguous RBs (or clusters). Accordingly, the RBs 831-833 may be allocated as a cluster, and may be indexed by 835-837. These RBs may be used when values of the intermediate variable m' are 6, 2, and 10, respectively, in this example. Additional clusters (such as 821-823) are also shown. It should be noted that embodiments are not limited to the number and/or sizes of the clusters shown in the example of FIG. 8, and are also not limited to the mappings shown in the example of FIG. 8.

It should be noted that the mapping of the PRB indexes (like 825-826 and 835-837) with the value of m' as shown in FIG. 8 is an example mapping that is not limiting, and any suitable mapping may be used. As a non-limiting example, the mapping shown in FIG. 8 may be determined using a formula such as:

$$n'_{PRB} = \begin{cases} \alpha, & \text{if } \beta = 0 \\ \left\lfloor \beta \frac{N_{RB}^{UL}}{N_{block} - 1} \right\rfloor + (-1)^\alpha \lceil \frac{\alpha}{2} \rceil, & \text{otherwise} \\ N_{RB}^{UL} - \alpha - 1, & \text{if } \beta = N_{block} - 1 \end{cases}$$

$$\alpha = \left\lfloor \frac{m'}{N_{block}} \right\rfloor, \beta = \bmod(m', N_{block})$$

In some embodiments, a resource index (PRB index) may be predefined in a standard such as 3GPP or other. For instance, for a scheduling request (SR) message, the resource index for the PUCCH transmission may be fixed.

In some embodiments, the resource index (PRB index) may be defined as a function of a variable such as $n_{CCE}$. The eNB 104 may select an optimal frequency band for the UE 102 to transmit the PUCCH, and may indicate the optimal frequency band (portion of the network channel resources) by transmitting the value of m (or m') to the UE 102. The value of m or m' may be determined using any suitable technique. As a non-limiting example, the formula below may be used:

$$m = \begin{cases} m_{start} + (n_{CCE} - n_{start,CCE})/L, \text{ for pair-wise case} \\ m_{start} + \bmod((n_{CCE} - n_{start,CCE})/L, N_{block}), \text{ for cluster-wise case} \end{cases}$$

$$m_{start} = \lfloor (n_{start,CCE} + N_{PUCCH}^{(1)})/(cN_{sc}^{RB}/\Delta_{shift}^{PUCCH}) \rfloor$$

$$n_{start,CCE} = L\{(Y_k) \bmod \lfloor N_{CCE,k}/L \rfloor\}$$

$$n_{CCE} = L\{(Y_k + l) \bmod \lfloor N_{CCE,k}/L \rfloor\}, l = 0, 1, M^{(L)} - 1$$

In some embodiments, the resource index may be explicitly signaled in a DCI for downlink assignment. This option may be applicable for the case of hybrid automatic repeat request (HARQ) ACK/NACK and aperiodic channel state information (CSI) feedback. As an example, a field of two bits may be defined in the DCI to indicate the resource allocation for PUCCH transmission.

In some embodiments, the resource index may be included in RRC signaling dedicated to the UE 102. This option may be applicable for the case of periodic CSI feedback and semi-persistent scheduling (SPS) based downlink transmission.

In some embodiments, parameters such as flag_pucchTX-Mode and/or Nblock and/or others may be used, by higher layers as part of the determination and/or indication of the PUCCH resources. As an example, the parameter flag_pucchTXMode may be used, by higher layers, to indicate whether the PUCCH format is in localized transmission mode or not. This parameter may be signaled via RRC signaling dedicated to the UE 102, in some cases. As another example, the parameter Nblock may be used, by higher layers, to indicate a number of distributed RBs for the PUCCH allocation. For instance, a number of RBs in a cluster may be indicated. The parameter Nblock may be provided by a master information block (MIB), system information block (SIB) or UE specific RRC signaling. It may be used for cluster-based allocations of the PUCCH channel resources, in some cases.

Figure 9:
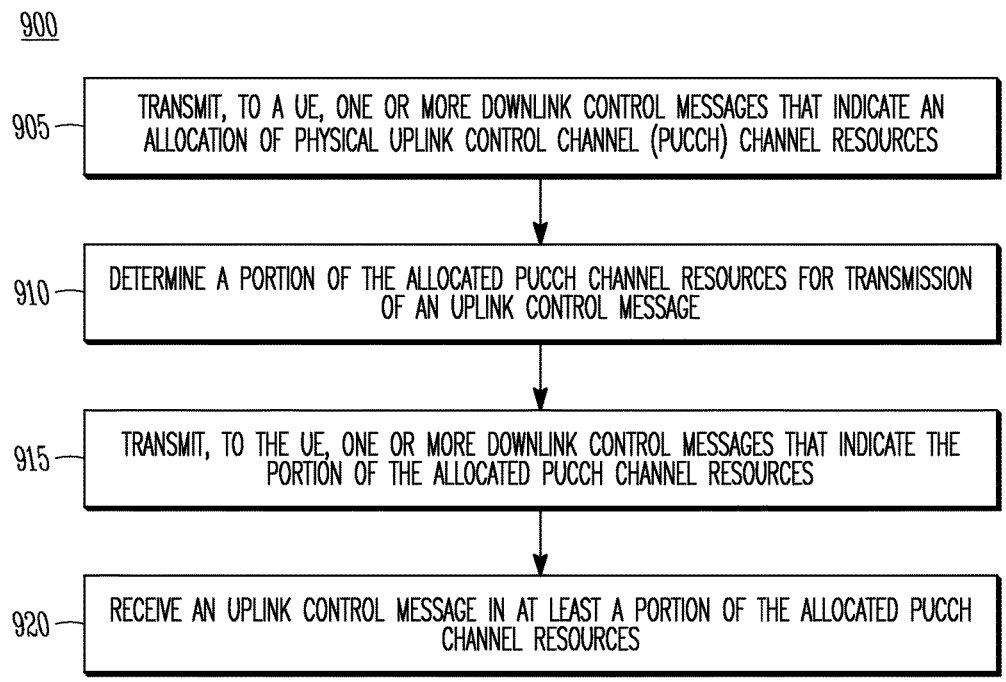
FIG. 9 illustrates the operation of another method of PUCCH communication in accordance with some embodiments.

FIG. 9 illustrates the operation of another method of PUCCH communication in accordance with some embodiments. As mentioned previously regarding the method 400, embodiments of the method 900 may include additional or even fewer operations or processes in comparison to what is illustrated in FIG. 9 and embodiments of the method 900 are not necessarily limited to the chronological order that is shown in FIG. 9. In describing the method 900, reference may be made to FIGS. 1-8, although it is understood that the method 900 may be practiced with any other suitable systems, interfaces and components. In addition, embodiments of the method 900 may refer to eNBs 104, UEs 102, APs STAs or other wireless or mobile devices. The method 900 may also refer to an apparatus for an eNB 104 and/or UE 102 or other device described above.

It should be noted that the method 900 may be practiced at an eNB 104, and may include exchanging of signals or messages with a UE 102. Similarly, the method 400 may be practiced at a UE 102, and may include exchanging of signals or messages with an eNB 104. In some cases, operations and techniques described as part of the method 400 may be relevant to the method 900. In addition, embodiments may include operations performed at the eNB 104 that are reciprocal or similar to other operations described herein performed at the UE 102. For instance, an operation of the method 900 may include transmission of a message by the eNB 104 while an operation of the method 400 may include reception of the same message or similar message by the UE 102.

In addition, previous discussion of various techniques and concepts may be applicable to the method 900 in some cases, including the network channel resources, PUCCH channel resources, various techniques for allocation of the PUCCH channel resources, downlink control messages, uplink control messages, and others. In addition, the example allocations shown in FIGS. 5-8 may also be applicable, in some cases.

At operation 905, the eNB 104 may transmit, to one or more UEs 102, one or more downlink control messages that may indicate an allocation of PUCCH channel resources. As previously described, the downlink control messages may indicate a type of allocation or other parameters or information to enable the UEs 102 to determine the allocation.

At operation 910, the eNB 104 may determine a portion of the allocated PUCCH channel resources for transmission of an uplink control message by a particular UE 102. At operation 915, the eNB 104 may transmit, to the UE 102, one or more downlink control messages that may indicate the portion of the allocated PUCCH channel resources. At operation 920, the eNB 104 may receive, from the UE 102, an uplink control message in at least a portion of the allocated PUCCH channel resources. In some embodiments, the eNB 104 may perform operations 910 and/or 915 and/or 920 for multiple UEs 102.

As an example, the determination of the portion of the PUCCH resources to be used by a particular UE 102 may be based on channel quality indicator (CQI) measurements on transmissions from the UE 102 in RBs included in the allocated PUCCH channel resources. Embodiments are not limited to the use of CQI measurements, however, as other measurements may be used, such as signal-to-noise ratio (SNR), signal level or others. The eNB 104 may therefore determine which PUCCH channel resources are to be used by the UE 102 in a manner that may enable a diversity gain and/or an improvement in SNR or other performance measure for the uplink transmission by the UE 102. In addition, such techniques may be applied, by the eNB 104, for multiple UEs 102.

In Example 1, an apparatus for User Equipment (UE) may comprise transceiver circuitry and hardware processing circuitry. The hardware processing circuitry may configure the transceiver circuitry to receive, from an Evolved Node-B (eNB), one or more downlink control messages that may indicate an allocation of physical uplink control channel (PUCCH) channel resources that are included in network channel resources. The hardware processing circuitry may further configure the transceiver circuitry to transmit an uplink control message in at least a portion of the allocated PUCCH channel resources. When the PUCCH channel resources are allocated according to an edge configuration, the PUCCH channel resources may be restricted to a lower edge portion and an upper edge portion of the network channel resources. When the PUCCH channel resources are allocated according to a distributed configuration, the PUCCH channel resources may include one or more middle portions of the network channel resources. The middle portions may be exclusive to the lower edge and upper edge portions.

In Example 2, the subject matter of Example 1 wherein the downlink control messages may indicate that the PUCCH channel resources are allocated in accordance with either the edge configuration or the distributed configuration.

In Example 3, the subject matter of one or any combination of Examples 1-2, wherein the lower edge portion may be substantially near a lower edge of a frequency range of the network channel resources and the upper edge portion may be substantially near an upper edge of the frequency range of the network channel resources.

In Example 4, the subject matter of one or any combination of Examples 1-3, wherein the lower edge portion may be included in approximately a lower 25 percent of the network channel resources. The upper edge portion may be included in approximately an upper 25 percent of the network channel resources. At least one of the middle portions may be included in approximately a middle 25 percent of the network channel resources.

In Example 5, the subject matter of one or any combination of Examples 1-4, wherein when the PUCCH channel resources are allocated according to the distributed configuration, the PUCCH channel resources may further include at least a portion of the lower edge portion or the upper edge portion.

In Example 6, the subject matter of one or any combination of Examples 1-5, wherein the allocated PUCCH channel resources may include multiple resource blocks (RBs). A first portion of the uplink control message may be transmitted during a first slot in a first RB included in the allocated PUCCH channel resources. When the uplink control message is transmitted according to a localized slot configuration, a second portion of the uplink control message may be transmitted during a second slot in the first RB. When the uplink control message is transmitted according to a non-localized slot configuration, the second portion of the uplink control message may be transmitted during the second slot in a second RB included in the allocated PUCCH channel resources.

In Example 7, the subject matter of one or any combination of Examples 1-6, wherein the RBs included in the allocated PUCCH channel resources may be non-contiguous.

In Example 8, the subject matter of one or any combination of Examples 1-7, wherein the RBs included in the allocated PUCCH channel resources may be divided into one or more groups of contiguous RBs.

In Example 9, the subject matter of one or any combination of Examples 1-8, wherein the allocated PUCCH channel resources may include multiple resource blocks (RBs). The downlink control messages may include a PUCCH resource index to indicate the portion of the allocated PUCCH channel resources to be used for transmission of the uplink control message.

In Example 10, the subject matter of one or any combination of Examples 1-9, wherein the downlink control messages may include a radio resource control (RRC) message. The PUCCH resource index may be included in a downlink control information (DCI) element included in the RRC message.

In Example 11, the subject matter of one or any combination of Examples 1-10, wherein the hardware processing circuitry may further configure the transceiver circuitry to receive, from the eNB, a UE identifier. The portion of the allocated PUCCH channel resources used for transmission of the uplink control message may be based at least partly on the UE identifier.

In Example 12, the subject matter of one or any combination of Examples 1-11, wherein the UE and the eNB may be arranged to operate according to a Third Generation Partnership Project (3GPP) protocol.

In Example 13, the subject matter of one or any combination of Examples 1-12, wherein the apparatus may further include one or more antennas coupled to the transceiver circuitry for the reception of the downlink control messages and for the transmission of the uplink control message.

In Example 14, a non-transitory computer-readable storage medium may store instructions for execution by one or more processors to perform operations for communication by a User Equipment (UE). The operations may configure the one or more processors to determine, from a group of resource blocks (RBs) included in network channel resources, one or more physical uplink control channel (PUCCH) RBs. The determination may be based at least partly on whether the UE operates according to a legacy configuration. The operations may further configure the one or more processors to transmit an uplink control message during a first slot and a second slot in the determined PUCCH RBs. The network channel resources may include a legacy portion of PUCCH RBs restricted to a lower edge frequency portion and an upper edge frequency portion of the network channel resources. The network channel resources may further include a non-legacy portion of PUCCH RBs that includes multiple RBs distributed in a portion of the network channel resources exclusive to the legacy portion.

In Example 15, the subject matter of Example 14, wherein the lower edge frequency portion may be included in approximately a lower 25 percent of the network channel resources. The upper edge frequency portion may be included in approximately an upper 25 percent of the network channel resources.

In Example 16, the subject matter of one or any combination of Examples 14-15, wherein a first portion of the uplink control message may be transmitted during the first slot in a first PUCCH RB. When the uplink control message is transmitted according to a localized slot configuration, a second portion of the uplink control message may be transmitted during the second slot in the first PUCCH RB. When the uplink control message is transmitted according to a non-localized slot configuration, the second portion of the uplink control message may be transmitted during the second slot in a second PUCCH RB.

In Example 17, the subject matter of one or any combination of Examples 14-16, wherein the non-legacy portion of PUCCH RBs may be divided into one or more groups of contiguous RBs.

In Example 18, the subject matter of one or any combination of Examples 14-17, wherein the operations may further configure the one or more processors to receive a downlink control message that includes a PUCCH resource index. The determination of the PUCCH RBs used for the transmission of the uplink control message may be based at least partly on the received PUCCH resource index.

In Example 19, the subject matter of one or any combination of Examples 14-18, wherein the downlink control messages may include a radio resource control (RRC) message. The PUCCH resource index may be included in a downlink control information (DCI) element included in the RRC message.

In Example 20, the subject matter of one or any combination of Examples 14-19, wherein the PUCCH resource index may be based at least partly on a diversity gain for the transmission of the uplink control message.

In Example 21, an apparatus for an Evolved Node-B (eNB) may comprise transceiver circuitry and hardware processing circuitry. The hardware processing circuitry may configure the transceiver circuitry to transmit one or more downlink control messages that indicate an allocation of physical uplink control channel (PUCCH) resource blocks (RBs) that are included in network channel resources. The hardware processing circuitry may further configure the transceiver circuitry to receive, from User Equipment (UE), an uplink control message in at least a portion of the PUCCH RBs. The network channel resources may include a legacy portion of PUCCH RBs restricted to a lower edge frequency portion and an upper edge frequency portion of the network channel resources. The network channel resources may further include a non-legacy portion of PUCCH RBs that includes multiple RBs distributed in a portion of the network channel resources exclusive to the legacy portion.

In Example 22, the subject matter of Example 21, wherein the downlink control messages may further indicate a localized slot configuration or a non-localized slot configuration to be used, by the UE, for transmission of the uplink control message. The uplink control message may be received during a first slot in a first PUCCH RB. When the uplink control message is received according to the localized slot configuration, a second portion of the uplink control message may be received during a second slot in the first PUCCH RB. When the uplink control message is received according to the non-localized slot configuration, the second portion of the uplink control message may be received during the second slot in a second PUCCH RB.

In Example 23, the subject matter of one or any combination of Examples 21-22, wherein the downlink control messages may further include a PUCCH resource index to indicate the portion of the allocated PUCCH channel resources to be used, by the UE, for transmission of the uplink control message.

In Example 24, the subject matter of one or any combination of Examples 21-23, wherein the hardware processing circuitry may be configured to determine one or more channel quality measurements for the PUCCH RBs. The PUCCH resource index may be determined based at least partly on the channel quality measurements.

In Example 25, the subject matter of one or any combination of Examples 21-24, wherein the PUCCH resource index may be determined based at least partly on a diversity gain for the transmission of the uplink control message.

In Example 26, the subject matter of one or any combination of Examples 21-25, wherein the downlink control messages may include a radio resource control (RRC) message. The PUCCH resource index may be included in a downlink control information (DCI) element included in the RRC message.

In Example 27, the subject matter of one or any combination of Examples 21-26, wherein the eNB and the UE may be arranged to operate according to a Third Generation Partnership Project (3GPP) protocol.

In Example 28, the subject matter of one or any combination of Examples 21-27, wherein the apparatus may further include one or more antennas coupled to the transceiver circuitry for the transmission of the downlink control messages and for the reception of the uplink control message.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for User Equipment (UE), the apparatus comprising transceiver circuitry and hardware processing circuitry, the hardware processing circuitry to configure the transceiver circuitry to:
   receive, from an Evolved Node-B (eNB), one or more downlink control messages that indicate an allocation of physical uplink control channel (PUCCH) channel resources that are included in network channel resources associated with the eNB, the allocated PUCCH channel resources include multiple resource blocks (RBs); and
   transmit an uplink control message in at least a portion of the allocated PUCCH channel resources,
   wherein when the PUCCH channel resources are allocated according to an edge configuration, the PUCCH channel resources are restricted to a lower edge portion and an upper edge portion of the network channel resources, excluding a lower edge and an upper edge of the network channel resources,
   wherein when the PUCCH channel resources are allocated according to a distributed configuration, the PUCCH channel resources include one or more middle portions of the network channel resources, the middle portions exclusive to the lower edge and upper edge portions, and
   wherein when the RBs are distributed throughout the network channel resources, the RBs are divided into multiple groups of contiguous RBs in the middle portions of the network channel resources.

2. The apparatus according to claim 1, wherein the downlink control messages indicate that the PUCCH channel resources are allocated in accordance with either the edge configuration or the distributed configuration.

3. The apparatus according to claim 1, wherein:
   the lower edge portion is included in approximately a lower 25 percent of the network channel resources,
   the upper edge portion is included in approximately an upper 25 percent of the network channel resources, and
   at least one of the middle portions is included in approximately a middle 25 percent of the network channel resources.

4. The apparatus according to claim 1, wherein when the PUCCH channel resources are allocated according to the distributed configuration, the PUCCH channel resources further include at least a portion of the lower edge portion or the upper edge portion.

5. The apparatus according to claim 1, wherein:
   a first portion of the uplink control message is transmitted during a first slot in a first RB included in the allocated PUCCH channel resources,
   when the uplink control message is transmitted according to a localized slot configuration, a second portion of the uplink control message is transmitted during a second slot in the first RB, and
   when the uplink control message is transmitted according to a non-localized slot configuration, the second portion of the uplink control message is transmitted during the second slot in a second RB included in the allocated PUCCH channel resources.

6. The apparatus according to claim 1, wherein when the PUCCH channel resources are allocated according to the distributed configuration, the distributed configuration is applied to both semi-persistent and non semi-persistent PUCCH formats, the semi-persistent PUCCH formats using at least one of the lower or upper edge portion of the network channel resources and the non semi-persistent PUCCH formats using at least the one or more middle portions of the network channel resources.

7. The apparatus according to claim 1, wherein:
   the allocated PUCCH channel resources include multiple resource blocks (RBs),
   the downlink control messages include a PUCCH resource index to indicate the portion of the allocated PUCCH channel resources to be used for transmission of the uplink control message.

8. The apparatus according to claim 7, wherein:
   the downlink control messages include a radio resource control (RRC) message, and
   the PUCCH resource index is included in a downlink control information (DCI) element included in the RRC message.

9. The apparatus according to claim 1, wherein:
   the hardware processing circuitry is to further configure the transceiver circuitry to receive, from the eNB, a UE identifier, and
   the portion of the allocated PUCCH channel resources used for transmission of the uplink control message is based at least partly on the UE identifier.

10. The apparatus according to claim 1, wherein the UE and the eNB are arranged to operate according to a Third Generation Partnership Project (3GPP) protocol.

11. The apparatus according to claim 1, wherein the apparatus further includes one or more antennas coupled to the transceiver circuitry for the reception of the downlink control messages and for the transmission of the uplink control message.

12. A non-transitory computer-readable storage medium that stores instructions for execution by one or more processors to perform operations for communication by a User Equipment (UE), the operations to configure the one or more processors to:

determine, from a group of resource blocks (RBs) included in network channel resources associated with an evolved NodeB (eNB), one or more physical uplink control channel (PUCCH) RBs, wherein the determination is based at least partly on whether the UE operates according to a legacy configuration, transmit an uplink control message during a first slot and a second slot in the determined PUCCH RBs, wherein the network channel resources include a legacy portion of PUCCH RBs restricted to a lower edge frequency portion and an upper edge frequency portion of the network channel resources, excluding a lower edge and an upper edge of the network channel resources, and wherein the network channel resources further include a non-legacy portion of PUCCH RBs that includes multiple RBs distributed in a portion of the network channel resources exclusive to the legacy portion, and the non-legacy portion of PUCCH RBs are divided into multiple groups of contiguous RBs.

13. The non-transitory computer-readable storage medium according to claim 12, wherein:
the lower edge frequency portion is included in approximately a lower 25 percent of the network channel resources, and
the upper edge frequency portion is included in approximately an upper 25 percent of the network channel resources.

14. The non-transitory computer-readable storage medium according to claim 12, wherein:
a first portion of the uplink control message is transmitted during the first slot in a first PUCCH RB,
when the uplink control message is transmitted according to a localized slot configuration, a second portion of the uplink control message is transmitted during the second slot in the first PUCCH RB, and
when the uplink control message is transmitted according to a non-localized slot configuration, the second portion of the uplink control message is transmitted during the second slot in a second PUCCH RB.

15. The non-transitory computer-readable storage medium according to claim 12, wherein the legacy and non-legacy portion of PUCCH RBs is applied to both semi-persistent and non semi-persistent PUCCH formats, the semi-persistent PUCCH formats using at least one of the legacy or non-legacy portion of PUCCH RBs and the non semi-persistent PUCCH formats using at least the non-legacy portion of PUCCH RBs.

16. The non-transitory computer-readable storage medium according to claim 12, wherein:
the operations further configure the one or more processors to receive a downlink control message that includes a PUCCH resource index, and
the determination of the PUCCH RBs used for the transmission of the uplink control message is based at least partly on the received PUCCH resource index.

17. The non-transitory computer-readable storage medium according to claim 16, wherein:
the downlink control messages include a radio resource control (RRC) message, and
the PUCCH resource index is included in a downlink control information (DCI) element included in the RRC message.

18. The non-transitory computer-readable storage medium according to claim 16, wherein the PUCCH resource index is based at least partly on a diversity gain for the transmission of the uplink control message.

19. An apparatus for an Evolved Node-B (eNB), the apparatus comprising transceiver circuitry and hardware processing circuitry, the hardware processing circuitry to configure the transceiver circuitry to:
transmit one or more downlink control messages that indicate an allocation of physical uplink control channel (PUCCH) resource blocks (RBs) that are included in network channel resources associated with the eNB; and
receive, from User Equipment (UE), an uplink control message in at least a portion of the PUCCH RBs,
wherein the network channel resources include a legacy portion of PUCCH RBs restricted to a lower edge frequency portion and an upper edge frequency portion of the network channel resources, excluding a lower edge and an upper edge of the network channel resources, and
wherein the network channel resources further include a non-legacy portion of PUCCH RBs that includes multiple RBs distributed in a portion of the network channel resources exclusive to the legacy portion, and the non-legacy portion of PUCCH RBs are divided into multiple groups of contiguous RBs.

20. The apparatus according to claim 19, wherein:
the downlink control messages further indicate a localized slot configuration or a non-localized slot configuration to be used, by the UE, for transmission of the uplink control message,
the uplink control message is received during a first slot in a first PUCCH RB,
when the uplink control message is received according to the localized slot configuration, a second portion of the uplink control message is received during a second slot in the first PUCCH RB, and
when the uplink control message is received according to the non-localized slot configuration, the second portion of the uplink control message is received during the second slot in a second PUCCH RB.

21. The apparatus according to claim 19, wherein the downlink control messages further include a PUCCH resource index to indicate the portion of the allocated PUCCH channel resources to be used, by the UE, for transmission of the uplink control message.

22. The apparatus according to claim 21, wherein:
the hardware processing circuitry is configured to determine one or more channel quality measurements for the PUCCH RBs, and
the PUCCH resource index is determined based at least partly on the channel quality measurements.

23. The apparatus according to claim 21, wherein the PUCCH resource index is determined based at least partly on a diversity gain for the transmission of the uplink control message.

24. The apparatus according to claim 19, wherein:
the downlink control messages include a radio resource control (RRC) message, and
the PUCCH resource index is included in a downlink control information (DCI) element included in the RRC message.

25. The apparatus according to claim 19, wherein the eNB and the UE are arranged to operate according to a Third Generation Partnership Project (3GPP) protocol.

26. The apparatus according to claim 19, wherein the apparatus further includes one or more antennas coupled to the transceiver circuitry for the transmission of the downlink control messages and for the reception of the uplink control message.

* * * * *